INVENTOR
RENE ALEXANDRE VINCENT KYROUDIS
BY
Nolte & Nolte
ATTORNEYS

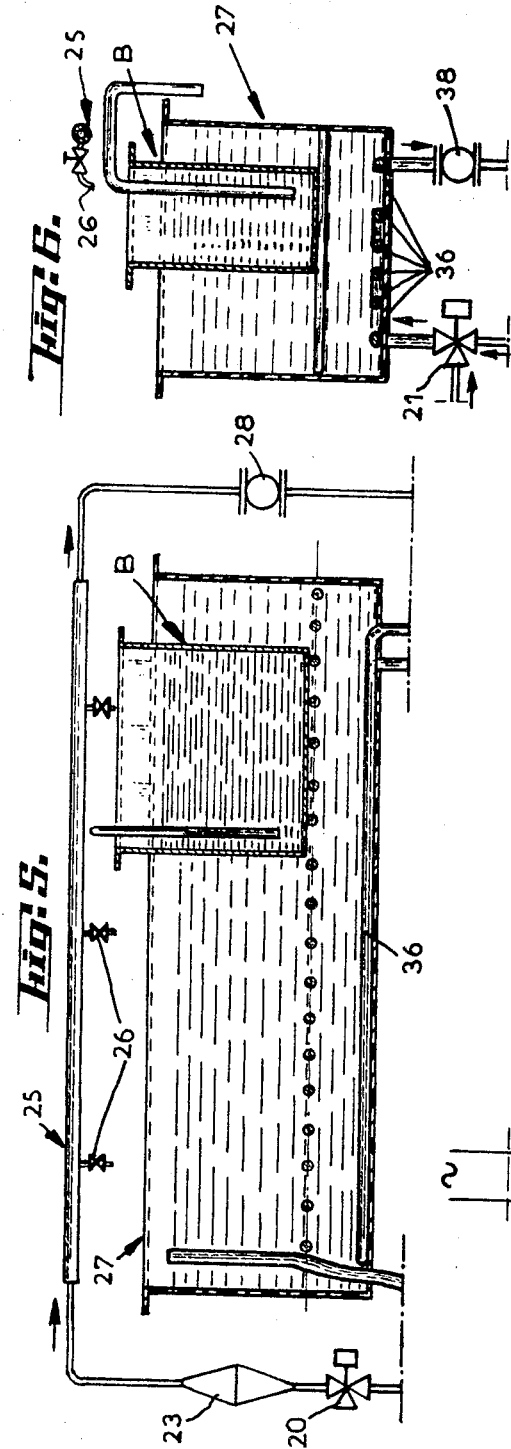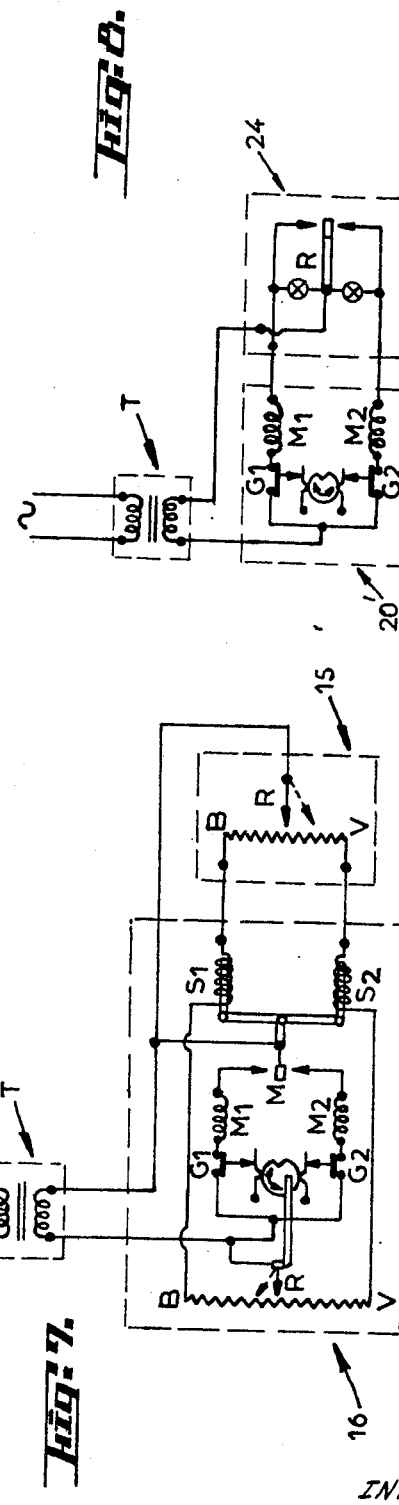

United States Patent Office 3,512,580
Patented May 19, 1970

3,512,580
DEVICE FOR PROVIDING HEAT-CONVEYING FLUID
Rene Alexandre Vincent Kyroudis, 3 Allee de la Rochefoucauld-Clichy-sous-Bois, Seine St. Denis France
Filed Sept. 21, 1967, Ser. No. 669,525
Claims priority, application France, Sept. 30, 1966, 78,319
Int. Cl. G03d 3/06; G05d 23/13
U.S. Cl. 165—36                    10 Claims

ABSTRACT OF THE DISCLOSURE

This invention relates to a device for supplying heat-carrying fluid to an installation, such as a film washing apparatus, comprising heating means and fluid-drawing means to be respectively supplied with a fluid at a constant and adjustable temperature. Warm fluid is fed to said means by a common heat generator through respective fluid circuits, each of which includes a mixing valve operative to admix the warm fluid supplied by said generator with relatively cooler fluid derived from the return-to-generator conduit and/or supplied by an external source. Said generator and said valves are controlled by respective temperature regulating means.

---

The present invention relates in a general way to devices designed to provide a heat-conveying fluid such as warm water to an installation or an apparatus comprising heating means as well as fluid-drawing means, both means being respectively supplied with a fluid at a constant and adjustable temperature.

The invention applies more particularly but not exclusively to a device designed to feed a washing apparatus for films and photographic pictures. In this special application, it is known that the films or photographs to wash as well as the water securing this washing should be very precisely maintained at a well defined and constant temperature. To this effect, the washing of the films and the photographs is usually performed in washers or other vessels maintained at said temperature by appropriate means such as the use of a thermostatic bath. Difficult technical problems are met to maintain identical and constant the temperatures of the thermostatic bath and of the washing water, especially owing to the fact that the bath exhibits a high thermal inertia while the irregular outflow of the washing water requires that the regulation of its temperature be carried out by means of a device having a very low inertia. Up to now, these conditions could only be met by providing entirely independent means to heat the washing water and the thermostatic bath, and this solution entails many drawbacks affecting not only the manufacturing and servicing costs of said devices, but also the very operation of the apparatus, especially concerning the upkeep of identical temperatures for the washing water and the thermostatic bath.

The present invention aims at overcoming these drawbacks by providing an improved device, of a more simple and less expensive structure, including temperature adjusting means with a high sensitiveness which secure a very reliable operation.

The device conformable to this invention is remarkable especially in that it includes a first and a second fluid circuit to which are respectively incorporated heating and fluid-drawing means, said circuits being supplied in parallel by a heat generator common to both of them and provided with associated adjusting means, said generator heating the fluid to a provisional temperature which is above the temperatures required for the supply of said heating and fluid-drawing means, each of said circuits including a mixing valve which admixes the warm fluid supplied by said generator with a relatively cool fluid derived from the back-to-generator conduit of said circuit and/or supplied by an external source, said valve being actuated by a servo-motor controlled by a thermostat sensible to the difference between the effective fluid temperature taken at the fluid-drawing or heating means incorporated to said circuit and the provisional temperature at a rated value.

Thus, the device of the invention, in addition to the simplified structure resulting from a single heat generator, offers the advantage of an inexpensive service, as the fluid flows in a closed circuit, the external source intervening only to compensate the deliveries of the fluid-drawing circuit, and the generator intervening only to heat this additional fluid and to compensate the heat losses. Moreover, the parallel layout of the circuits secures to the fluid an almost uniform temperature in the different portions of the device, facilitating by that the action of the adjusting means associated to each circuit.

According to other features of the device conformable to the invention, the servo-motor actuating each one of said mixing valves shifts the adjusting unit of said valve in a direction intended to compensate the aforementioned temperature differences, the shifting away of the adjusting unit being proportional to the value of said differences in the case of the valve incorporated to the first circuit, or again said shifting away lasting until said differences are completely cancelled out in the valve associated to said second circuit.

These arrangements offer the advantage of adapting the response of the temperature adjusting devices respectively to the thermal inertia of the heating means and to the irregular outflow of the fluid-drawing means.

Still according to other features of the invented device, the aforesaid generator includes several heating elements, the selective supply of which is secured by a commutator unit actuated by a servo-motor which is controlled by a thermostat sensible to the difference between the effective fluid temperature at the outlet of said generator and the value of the provisional fluid temperature, the shifting of the selecting element of the commutator being proportional to the value of the temperature differences.

Many other features and advantages of the invention will appear more clearly by reading the following detailed description of an embodiment given by way of an example, with reference to the accompanying drawings, wherein:

FIGS. 5 and 6 illustrate respectively in longitudinal and transverse cross-sections the washing vessel; and FIGS. 7 and 8 are diagrammatic illustrations of the thermal adjusting means incorporated to the apparatus of FIG. 1.

Figure 1:
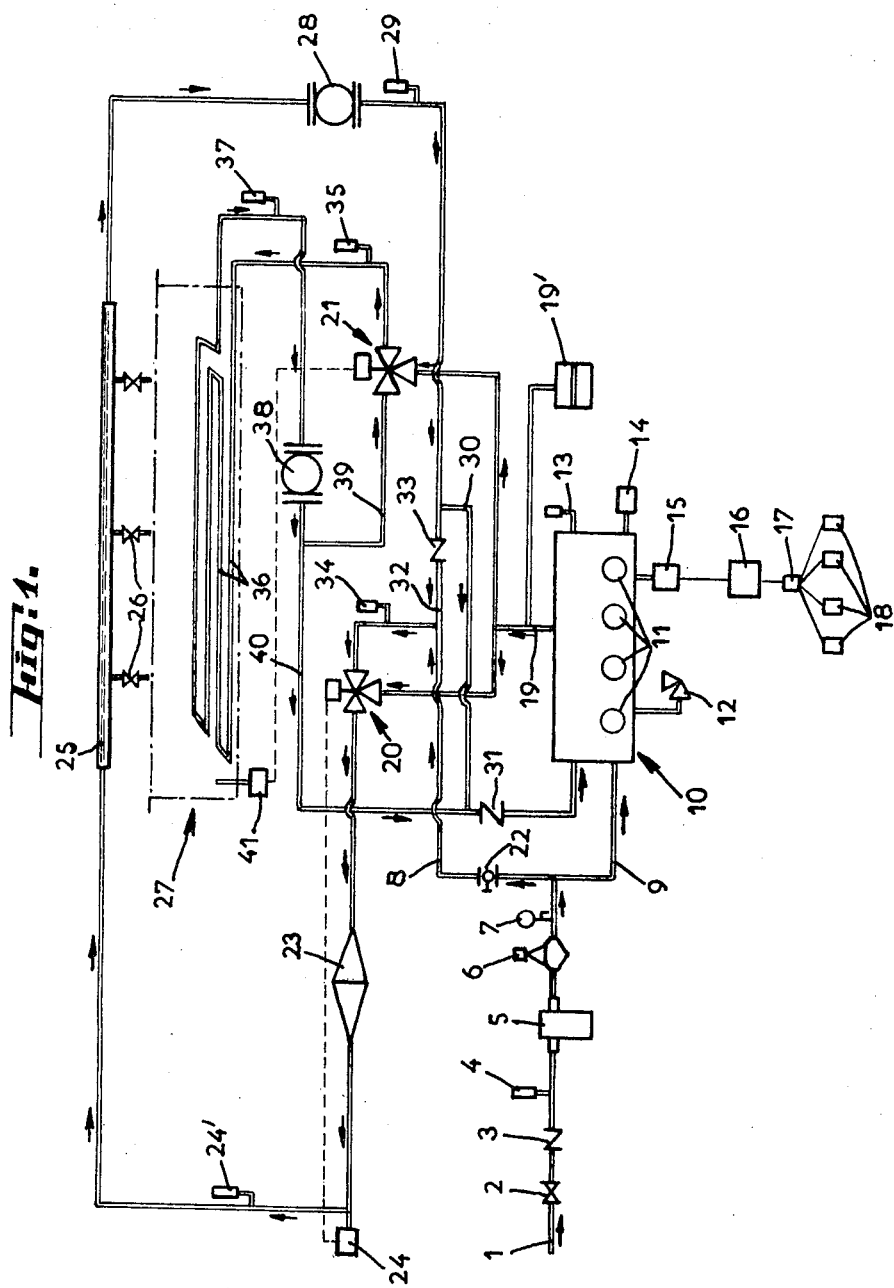
FIG. 1 shows the general diagram of an apparatus for washing films or photographic pictures, laid out according to the invention.

The diagrammatically illustrated apparatus of FIG. 1 is designed for the washing of films or of photographic pictures after their developing. It is known that this processing requires a very pure water, devoid of any contaminating agent, and at a temperature which has to be strictly maintained at a well defined value, for instance 24° C.

On FIG. 1, reference numeral 1 indicates an admission conduit for main feed water under pressure, while 2 is a main stop cock, 3 a non-return flap or check valve and 4 a controlling thermometer. The cold water thus introduced into the apparatus is at first subjected to a purification treatment in an appliance 5, such as for instance an ion exchanger with silicates, then its pressure is reduced to a constant value, for example of 2.5 kg./cm.$^2$, by means of a pressure reducer 6, the pressure of the treated water being controlled by means of a manometer 7. This water under a constant pressure and at a controlled temperature is then divided between a direct feed pipe of the washing bench 8 and a second pipe 9 leading to the heat generator or boiler 10. The latter, described in detail hereinafter, is equipped with four immersion boiling devices or immersion heaters 11 with a high specific load, with a safety valve 12 including an exhaust pipe leading to a drain, with a controlling thermometer 13 and a water level stabilizer 14, of a two-fins type, by which the supply of the immersion heaters is imperiously suspended when the provisional value of the output water temperature, for instance set at 35° C., is trespassed. Besides, the generator 10 is provided with a thermostat 15 acting in a progressive and proportional way upon an automatic contact selector 16, which itself monitors a return-to-zero relay 17 and disconnectors 18, each one of the latter actuating and protecting one of the immersion heaters 11. These different component parts, as well as their interactions will be further described herebelow.

The water issuing at a constant temperature from the generator 10 passes through a conduit 19, upon which is tapped by a winding part an expansion tank or a pressure accumulator 19', for example of the diaphragm and pressurized nitrogen type. Thus, the water under constant pressure and temperature flowing through the conduit 19 reaches two motor-driven mixing valves 20 and 21, each of which includes two inlet channels and one outlet channel. The second inlet channel of the mixing valve 20 is supplied with cold water under a constant pressure by the aforementioned pipe 8, which comprises advantageously a needle cock or pin cock 22 intended to create load losses equalling the load introduced by the generator 10.

The tepid water issuing from the mixing valve 20 reaches, after its passage through a turbo-mixer 23 designed to make its temperature homogeneous (said temperature being controlled by a thermostat 24 acting upon the servo-motor of the valve 20 and by a thermometer 24) the washing bench 25 upon which are branched one or several drawing-off cocks 26, installed above the washer indicated in broken lines at 27. The washing water which is not utilized is then carried out by means of a circulating pump 28 and, its temperature having been controlled by means of a thermometer 29, said water returns, either to the generator 10 through a pipe 30 provided with a non-return flap or check valve 31, or to the valve 20 through a return piping 32, also provided with a check valve 33. Thus, the mixing valve 20 is supplied on the one hand with warm water at a constant temperature from the generator 10 and, on the other hand, with cold water as well from the direct heat pipe 8 as from the return piping 32 from the washing bench 25, the temperature of the admixture resulting from these two conduits being controlled by a thermometer 34.

In a similar way, the water issuing from the mixing valve 21 passes, once its temperature has been controlled by means of a thermometer 35, in a serpentine pipe 36, arranged at the bottom of the washer 27. The water issuing from said serpentine pipe is, after a control of its exhaust temperature by means of a thermometer 37, taken by a pump 38, and returns, on the one hand, to the mixing valve 21 through a conduit 39 and, on the other hand, to the generator 10 by a conduit 40.

Now will be described in detail the main component units of the apparatus just presented by its main features.

The different units controlling the cold water supply, especially the treating device 5 and the pressure reducer 6, are of standard types. The generator 10 may also be of an appropriate standard type, but is preferred to be conformable to the French patent application No. PV 73,340, filed on Aug. 17, 1966, by this applicant and relating to: "Generator for Heat-Carrying Fluid."

Figure 2:
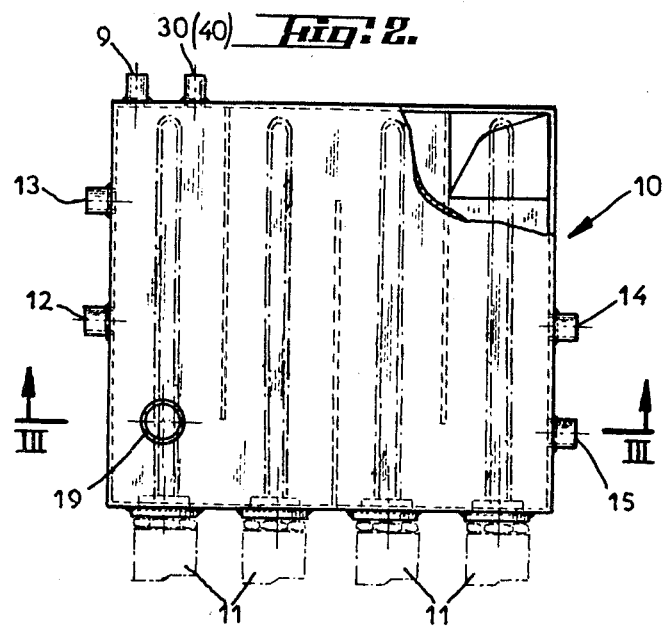
FIGS. 2 and 3 show, respectively seen from above and in a transverse cross-section, the warm water generator supplying the apparatus of FIG. 1.
Figure 3:
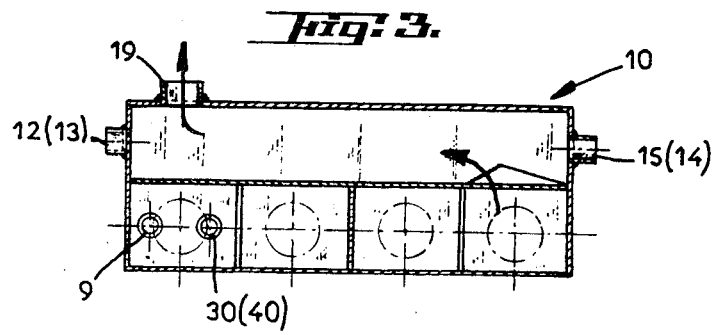

This generator, shown on FIGS. 2 and 3, is mainly constituted by a fluid-tight casing 10 with the general configuration of a parallelepipedon and with a small relative height, said casing being divided into two compartments by a horizontal partition. The bottom compartment makes up the heating chamber, while the top compartment is used as a tank or buffer-reservoir. To this effect, the bottom compartment includes a number of baffle plates through which the water to be heated coming, on the one hand, from the pipe 9 and, on the other hand, from the return pipings 30 and 40, is guided to a communicating orifice through which it passes into the top compartment of the generator. In each branch of said baffle is arranged an immersion heater 11, the heating unit of which is made up by a tube, for instance of copper, wherein is housed an electric resistor with a high specific load. The warm water is exhausted from the top compartment of the generator 10 through a connecting pipe upon which is branched the conduit 19, the lateral walls of this same compartment including besides four connecting tubes, for the connection of the safety valve 12, of the controlling thermometer 13, of the water stabilizer 14 and finally for the thermostat 15.

The mixing valves 20 and 21, of the three-channel type, are actuated separately by an individual servomotor which will be described in detail hereinafter. The servomotor of the valve 20 is controlled by the thermostat 24 measuring the temperature of the washing water at the inlet of the washing bench 25, while the servo-motor of the valve 21 is controlled by a thermostat 41 measuring the temperature of the water in the washer 27.

Figure 4:
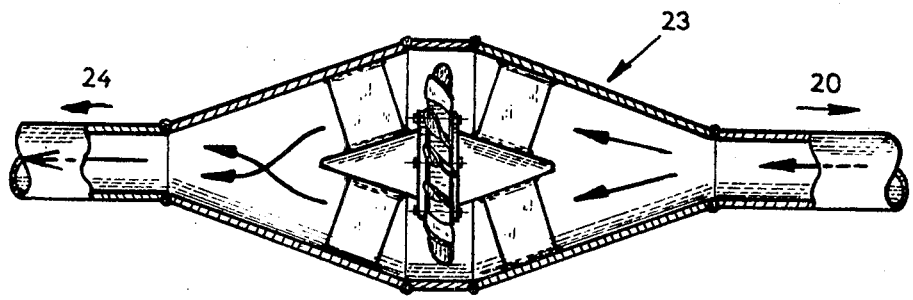
FIG. 4 is an axial section across a turbo-mixer securing a homogeneous temperature to the washing water.

The turbo-mixer 23 located on the feed pipe of the washing bench 25 is illustrated separated on FIG. 4 by an axial cross-section. This appliance is intended to render instantaneously homogeneous the temperature of the cold and warm water mixture coming from the valve 20. It is mainly constituted by a biconical body wherein a multiblade helix is arranged, two internal guiding cones being provided on both sides of this helix.

A detailed illustration of the washer 27 may be found on FIGS. 5 and 6. The vessel 27, advantageously worked out in a single piece of a synthetic resin, for instance of the polyvinyl chloride type, is provided with an internal grating supporting the washing vessels B, of a proper type, containing the films or photographs to wash. Under this grating is arranged a heating serpentine 36, advantageously constituted by a simple tube of plastic material. Finally, the washer 27 comprises an overflow, connected for instance with a draining pipe provided with a siphon. The vessels B, also provided with a draining siphon, receive directly the washing water supplied by the drawing-off cocks 26 branched on the washing bench 25, and are advantageously provided with a flexible end piece to guide the jet.

The circulating pumps 28 and 38, located respectively in the return pipings of the washing bench 25 and of the heating serpentine 36, are circulation accelerators of a standard type, with a wet rotor and a dry stator, intended for a continuous operation. Advantageously, the output and manometrical values of these appliances are adjustable.

As may be appreciated, the apparatus of the invention comprises two distinct circuits: the circuit supplying the washing bench 25, providing the water for washing films or photographs, and a heating circuit including the serpentine 36 placed in the washer 27 with the help of which the water contained by said washer may be maintained at a constant temperature. It should be noted that the arrangement of these two circuits is such, that an admixture of the corresponding waste water exhausted from the washing vessels B or from the washer 27 with the washing water and the heating water is excluded under all circumstances.

Now will be described the adjusting means maintaining at an identical and constant temperature the water supplied by these two circuits.

At first will be described the adjusting device of the warm-water generator 10, a partial diagram of which is given on FIG. 7. The thermostat 15, for instance of the type comprising a plunger bulb of red copper, acts in a progressive and proportional way upon the automatic contact selectors 16. As seen on FIG. 7, the control unit of the thermostat 15 is made up by a potentiometer the slider R of which is directly connected to one of the terminals of the secondary winding of a supply transformer T. Both ends B, V of this potentiometer are connected, by means of respective electro-magnets $S_1$, $S_2$ forming balancing relays, to the corresponding terminals B', V' of a reaction potentiometer, the slider R' of which is electrically connected to the other terminal of the secondary winding of the supply transformer T and mechanically driven by the rotor of the servo-motor associated to the automatic contact selector 16. The latter is essentially constituted by a set of micro-contacts co-operating with a commutator unit driven by the aforementioned servo-motor to secure, according to the thermal requirements, the selective supply of the immersion heaters 11 through the relays 18 associated to the latter. Besides, this selector comprises an additional contact allowing to energize the return-to-zero relay 17 in case of a tension failure.

The servo-motor of the contact selector 16 is equipped with two short-circuited armatures fastened to the same spindle, each rotating in the field of a corresponding stator $M_1$, $M_2$. These stators may be selectively supplied by the supply transformer T, according to the position of a mobile contact M carried by the moving armature of the balancing relays $S_1$, $S_2$, and are connected so as to cause rotations opposite to those of the rotor of the servo-motor. The latter drives the slider R of the aforesaid reaction potentiometer, as indicated hereabove, as well as a cam actuating end-of-travel contacts $G_1$ and $G_2$ securing the automatic cutting-out of the corresponding stator windings $M_1$ and $M_2$.

The just described adjusting device being supposed balanced, the sliders, R' of both potentiometers are in the same relative position, so that no voltage is applied to the terminals of the electromagnets $S_1$ and $S_2$ and hence that the mobile contact M carried by the armature common to both electromagnets remains in the represented neutral position where neither of the stators $M_1$ and $M_2$ is supplied. Any variation in the temperature of the warm water issuing from the generator 10 acts upon the thermostat 15 which shifts the slider R of the associated potentiometer: consequently, opposite electromotive forces are applied to the electromagnets $S_1$ and $S_2$, and the tilting of the armature common to both magnets brings the mobile contact M upon either one of the assocaited steady contacts so as to supply either one of the stators $M_1$ or $M_2$ of the servo-motor, in such way that the rotor of the latter turns in a direction proper to compensate the deflections from the provisional temperature. The motion of the rotor drives the slider R' of the reaction potentiometer and, as soon as the angular motion of said rotor reaches a value proportional to the temperature deflection, the differential voltage supply of the electromagnets $S_1$ and $S_2$ is cancelled out, so that their common armature returns to its neutral position or resting position, in which neither of the stators $M_1$ or $M_2$ of the servo-motor is supplied. The angular motion of the rotor, and consequential the control thus secured, are exactly proportional to the deflection from the provisional temperature. The end-of-travel contacts $G_1$ and $G_2$ prevent under any circumstances the angular motion of the rotor of the servo-motor from passing beyond a rated amplitude in both directions.

The adjusting device for the heating water temperature in the washer 27 comprises a thermostat 41, for instance of the same type as the thermostat 15, controlling the servo-motor energizing the mixing valve 21, said servo-motor being of a structure similar to that of the just described servo-motor actuating the automatic contact selector 16. Consequently, the rotary blade of the valve 21 has an angular motion between two end positions, said motion being proportional to the difference between the actual water temperature in the washer 27 and the provisional temperature for instance set at 24° C.

The mixing valve 20 is provided with a controlling servo-motor 20' similar to those actuating the automatic contact selector 16 and the valve 21, but this servo-motor 20' has no reaction potentiometer and is controlled by the thermostat 24 measuring the water temperature at the inlet to the washing bench 25. A diagrammatical representation of this adjusting device is given on FIG. 8, wherein a two-rotor servo-motor may be seen, both stators $M_1$ and $M_2$ being separately series connected with a corresponding end-of-travel contact $G_1$, $G_2$ and selectively supplied by means of a mobile contact R integral with the thermostat 24. Thus, the adjusting unit of the valve 20 is driven by the servo-motor 20' in a direction proper to compensate the temperature difference measured by this thermostat 24, said driving being performed until the temperature difference is completely cancelled out.

Of course, the just described adjusting devices could be replaced by other devices exhibiting equivalent features, especially by electronic adjusting devices of a proper type.

Finally, many other modifications could be brought in this invention without leaving its scope, so be it understood that it is by no means limited to the described and illustrated method of embodiment, given only by way of example, said invention being defined by the following claims.

What I claim is:

1. A device for supplying heat-carrying fluid to an installation comprising fluid-heated means and fluid-drawing means to be respectively supplied with a fluid heated to a predetermined temperature, characterized in that said device comprises first and second closed-loop circuits with which said fluid-heated means and fluid-drawing means are respectively associated, a common heat generator, an external source of fluid, said first and second circuits being connected in parallel to said common heat generator, said generator being adapted to heat the return fluid from said circuits and make-up fluid supplied by said external source to a temperature substantially higher than said predetermined temperature, and said first and second circuits each including a respective mixing valve having an outlet connected to said fluid-heated means and fluid-drawing means respectively, a first inlet connected to the outlet of said heat generator and a second inlet connected to the return-to-generator conduits of said circuits, thermostats responsive to the difference between said predetermined temperature and the actual temperature at said fluid-heated means and fluid-drawing means respectively, and servomotors adapted to actuated each of said valve means respectively under the control of said thermostats.

2. Device according to claim 1, characterized in that said heating means consist of a thermostatic bath heated by a serpentine incorporated to said first circuit, said associated thermostat measuring the temperature of said bath, whilst said fluid-drawing means consist of a bank provided with at least one cock, said associated thermostat measuring the fluid temperature at the inlet of said bank.

3. Device according to claim 2, characterized in that the servo-motor actuating said mixing valve of said first circuit shifts the control member thereof by a displacement proportional to the amplitude of the respective temperature difference, whilst the servo-motor actuating said mixing valve of said second circuit shifts the control member thereof until the respective temperature difference is completely cancelled out.

4. Device according to claim 1, characterized in that said heat generator comprises several heating elements selectively energized by a commutator unit actuated by a servo-motor controlled by a thermostat responsive to the deflection between the actual temperature of said fluid at the outlet of said generator and a further predetermined temperature, said servo-motor actuating the selecting member of said commutator unit by a displacement proportional to the amplitude of said deflection.

5. Device according to claim 1, characterized in that the return conduits of said first and second circuits comprising a respective circulation activator, each of said circuits includes a respective fluid-deriving pipe connecting the outlet of its circulation activator with one inlet of its aforesaid mixing valve.

6. Device according to claim 5, characterized in that said fluid-deriving pipe comprises a non-return and/or pressure-reducing valve.

7. Device according to claim 1, characterized in that said heat generator and said mixing valve inserted within said second circuit are supplied with cool fluid from said external source through respective pipings each provided with a pressure-reducing valve.

8. Device according to claim 1, characterized in that said return conduits of said first and second circuits include respective non-return valves.

9. Device according to claim 1, characterized in that the outlet of said heat generator is provided with a pressure regulator, notably of the diaphragm and compressed gas type.

10. Device according to claim 1, characterized in that said second circuit comprises a turbo-mixer located upstream of said fluid-drawing means and associated thermostat.

References Cited

UNITED STATES PATENTS 3,111,942  11/1963  Miller _____ 236—12 X

WILLIAM E. WAYNER, Primary Examiner

U.S. Cl. X.R.

95—97; 236—12; 126—362